Figure 1:
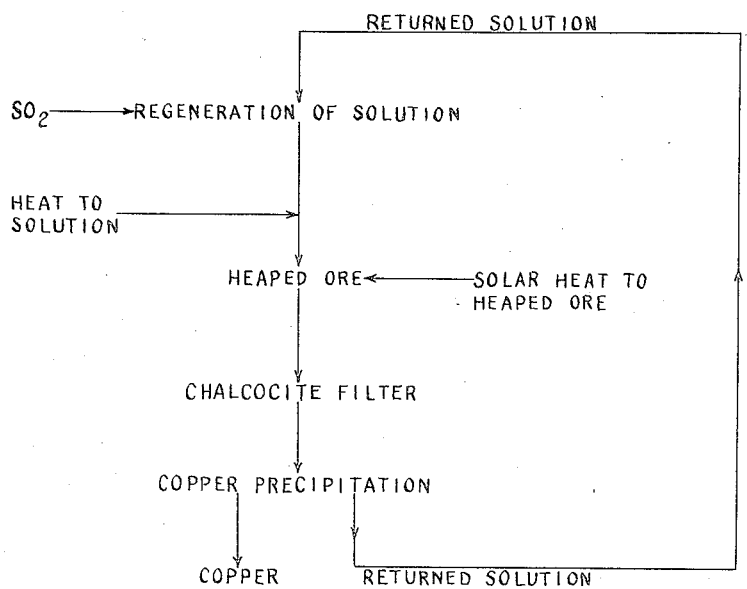

Oct. 6, 1931.  G. MOTT  1,825,752
ORE LEACHING PROCESS
Filed March 2, 1927   2 Sheets-Sheet 1

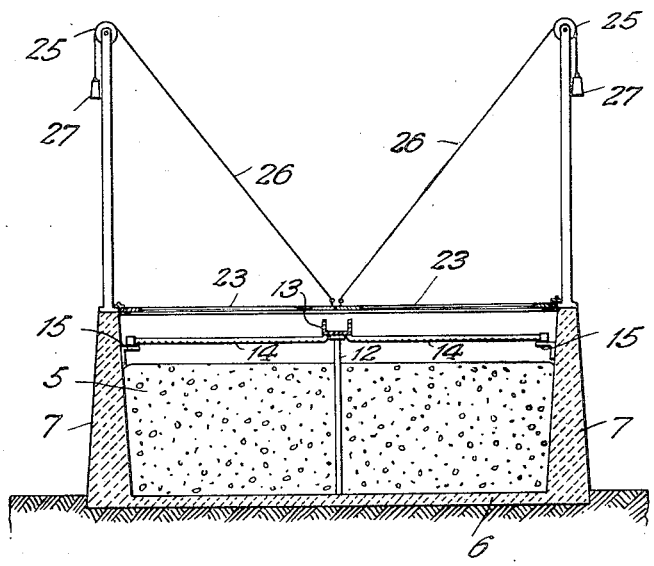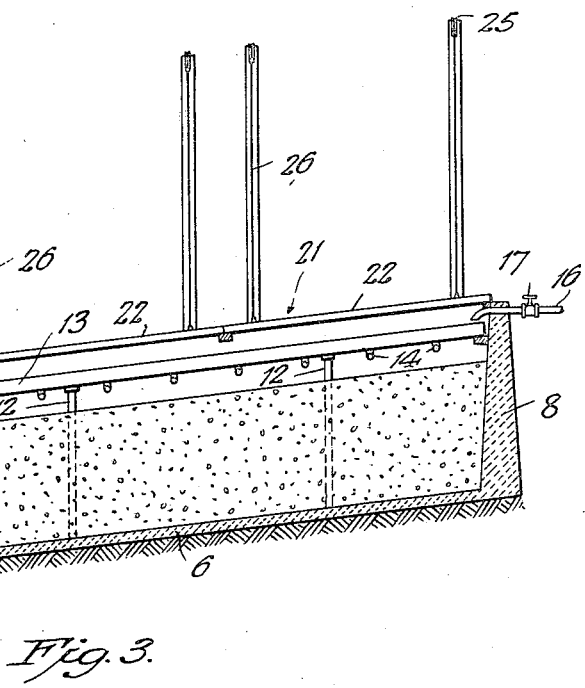

Patented Oct. 6, 1931

1,825,752

UNITED STATES PATENT OFFICE

GARRET MOTT, OF YONKERS, NEW YORK, ASSIGNOR TO PINTO VALLEY CO., OF NEW YORK, N. Y., A CORPORATION OF DELAWARE

ORE LEACHING PROCESS

Application filed March 2, 1927. Serial No. 171,918.

This invention relates to ore leaching processes for the treatment of ores and other value-containing materials, and for the purpose of illustration is herein described in connection with the heap leaching of copper-bearing ores, although not restricted to such use.

Heretofore the heap leaching of copper ores has been carried on by passing water intermittently over heaps of uncrushed ore for a period of years. Alternate periods of wetting and drying in long cycles have been relied upon, and the process as a whole has required from four to six years for the extraction of approximately seventy per cent. of the copper content of the ore.

On the other hand tank leaching has involved the use of lead-lined leaching tanks and other costly equipment and has been uncommercial for very lean ores.

An object of this invention is to provide an improved process whereby the above objections are obviated, and the heap leaching process is very greatly accelerated. It has been found that if a solution of ferric sulphate and sulphuric acid, of suitable strength and in the presence of uncombined oxygen, is brought into contact with the material to be treated, such for example as an ore containing copper sulphide crushed to a size that will permit ready access of the leaching solution to the values in the ore, not only are copper sulphate and ferrous sulphate produced, but ferrous sulphate in the solution is oxidized in the heap to ferric sulphate, and thus within the heap the sulphide of the ore is leached to a sulphate and the solution which effects this leaching is to some extent regenerated as to the active solvent for copper sulphide and thereby reconstituted in its leaching qualities in situ and thus maintained as an active leaching solution throughout its contact with the ore. It has been discovered that this can be brought about by the delivery of the described solution under such conditions that it trickles through the heap of ore in contact with atmospheric air, i. e., under conditions of open drainage as contrasted with submergence of ore particles in a vat or tank and this trickling through the ore in open drainage can be effected by spraying or dripping the solution upon the heap of ore. The regenerating effect appears to be due to the abstraction of oxygen from the air, and the reactions which take place are believed to be represented in a typical case by the following formulæ, Formula 1 representing the reaction of ferric sulphate and chalcocite to produce ferrous sulphate, copper sulphate and sulphur, and Formula 2 representing the reaction of ferrous sulphate, sulphuric acid and oxygen to produce ferric sulphate and water:

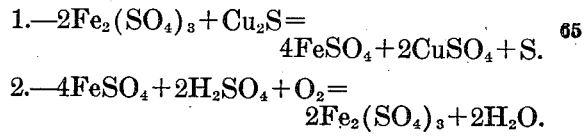

Suitable means may be provided for collecting the copper-bearing solution as it passes from the heap of material being treated. This copper-bearing solution, when collected, may be subjected to a suitable precipitation step in order to recover the copper. However the copper-bearing solution, before being subjected to the precipitation step, may be passed through a reducing filter of chalcocite and oxidized ore, or through a comparatively small heap of fresh ore containing these substances, (preferably concentrated) with the solution supplied in such profusion as to substantially prevent air-oxidizing action; or the chalcocite, the ore or the concentrate may be in a tank with substantial immersion by the solution flowing through it, in order to reduce ferric sulphate to ferrous sulphate and to consume sulphuric acid (both being consumed in productive work) and thereby to deliver to the precipitation step of the process a copper-bearing solution well adapted for that process and which will not, where the precipitation is by cementation, objectionably dissolve the iron which is used to precipitate the copper. After precipitation of the copper the solution, from which all but preferably a small part of the copper has been removed, may be subjected to an acid-forming and oxidizing treatment to replenish the sulphuric acid and to oxidize ferrous sulphate into ferric sulphate and thus to regenerate the solution and condition it for the leaching operation, thereby rendering the solution capable of efficient use in recycling the process.

According to this invention the leaching solution may be heated in order to facilitate the chemical reactions within the heap of ore or other material to be treated, and the heat may be augmented by utilizing the rays of the sun, or radiant solar heat may be utilized for heating the heap of ore and the solution percolating or trickling through the heap of ore or for diminishing loss of heat by conduction or evaporation. This may be accomplished by enclosure of the heaps which are subjected to the leaching operation, and also by providing a covering which is transparent or substantially so to the heat rays utilizable in the process. The enclosure of the heaps reduces loss of heat by radiation, reduces loss of heat and of solution by evaporation, prevents dilution by rain, prevents the flooding of the heaps and the washing away of the ore by heavy rains or cloudbursts, and augments the effectiveness of the heat applied by solar energy.

Other objects and advantages of this invention will appear from the following description of a process embodying this invention in connection with the accompanying drawings, which drawings include illustrations of apparatus adapted for use in carrying out such a process, in which drawings:

Figure 1 is a flowsheet indicating the various steps of such a process in their sequential order; Figure 2 is a transverse sectional view of an enclosed inclined platform adapted for supporting and enclosing the ore or other material to be treated; and Figure 3 is a central, longitudinal sectional view of the platform shown in Figure 2.

For the carrying out of the process embodying this invention, certain apparatus will be advantageous. The invention is not, however, limited to use in connection with any particular type of apparatus, but certain details of construction of apparatus which may be employed are shown and will be described.

In carrying out the process, a plurality of leaching platforms, one of which is indicated by the numeral 6 may be employed, upon which the ore or material to be treated is piled in heaps 5. These platforms may be constructed of concrete which may be made watertight and acid proof by spraying the surfaces with silica solutions or liquid asphalt compounds, or both. They are arranged at a suitable inclination, for example on a 10% slope. Side walls 7 and an end wall 8 are provided for each platform. At one end of each platform, the lower end as shown, a suitable closure consisting of an acid proof curtain 10 carried by a curtain roller 11, is shown. While these platforms may be of any suitable dimensions, the enclosed platform herein illustrated is represented as having a length of one hundred feet, a mean width of fifty feet and a height of twenty-one feet. At suitable intervals within the enclosure of the walls 7 and 8 of the platform, suitable supports 12 may be provided, which supports are adapted to receive a distributing launder 13 or the like, from which project a plurality of perforated branch pipes 14, having their outer ends supported by means of brackets 15 or the like, suitably connected to the side walls 7. The distributing launder 13 and its branch arms 14, are adapted to be readily removed when introducing ore into the platform by merely lifting them out. They are adapted to receive and distribute a leaching solution, for example ferric sulphate and sulphuric acid, from a supply pipe 16, which may be provided with a valve 17, adapted to control the flow of leaching solution from a suitable source into the distributing launder 13. In the platform 6 a suitable launder or collection gutter 19 may be formed at the lower end thereof, adjacent the curtain closure 10, in order to collect the copper-bearing solution as it drains from the heap 5 of material undergoing treatment, which solution may be removed from the collection launder or gutter 19 through a pipe 20 to be thereafter treated, with intermediate reduction and reaction if desired, in order to recover the copper by cementation precipitation or electrolytic precipitation, as may be most economical and advantageous.

In order to take advantage of solar heat and thus utilize such heat to facilitate or augment chemical reaction within the heap 5 while it is being treated, a suitable translucent or transparent closure 21 may be provided, such a closure being herein illustrated as including a plurality of sections 22, which are provided with glass panels 23 and are hingedly connected at their outer longitudinal edges to the side walls 7. This top closure is shown as inclined in correspondence with the inclined surfaces of the platforms 6 to shed water. Due to the size and weight of the sections 22, means may be provided for facilitating their being opened, and such means is herein shown as including a plurality of vertical posts 24, or the like, carrying at their upper ends pulleys 25 over which pass ropes or cables 26, connected to the sections 22 adjacent their respective meeting edges and carrying at their outer ends a plurality of counterweights 27.

An example of an ore which has been treated by this process is the ore of the Castle Dome Division of the Pinto Valley mine of Arizona. In carrying out the process embodying this invention with this ore, the ore is crushed to such a size, say one-half inch maximum, as will permit ready access of leaching solution to the mineral particles.

This crushed material is deposited upon the platform 6 in a heap 5, as shown, the lower end of the heap terminating at a point above the collection launder 19. After depositing the crushed ore upon the platform, the leaching solution, by opening the valve 17, is supplied to the distributing launder 13 from the pipe 16, whereupon such leaching solution is permitted to drip or spray from the perforated branch pipes 14 on to the top of the pile of material 5. This leaching solution consists of ferric sulphate and sulphuric acid of such strength as may be best suited to the ore under treatment, as, for example, one per cent. of sulphuric acid and 1.5% of ferric sulphate. If the ore carried oxide mineral to such an extent as to utilize a larger proportion of sulphuric acid the proportion of the latter would be increased. By reason of the fact that the leaching solution is dripped or sprayed upon the material to be treated, a certain quantity of oxygen, derived from the air which is in contact with the solution as the solution percolates or trickles through the heap, oxidizes the solution as above described to regenerate it during the leaching operation, thus maintaining an active leaching action throughout the leaching step of the process. The leaching solution may be heated by any suitable means prior to its being applied to the material to be treated, in order to facilitate the chemical reactions within the heap, and this heat may be augmented, reinforced or maintained by the enclosure of the heap and by utilizing the sun's rays which are permitted to pass through the panels 22, or even by concentrating the sun's rays upon the heap.

Assuming that the material being treated is an ore containing chalcocite, as does the ore above referred to, the fundamental reactions taking place within the material undergoing treatment appear to be as above stated. The ferric sulphate is changed to ferrous sulphate as the chalcocite is changed to copper sulphate and the ferrous sulphate, in the presence of sulphuric acid and oxygen, the latter being abstracted from the atmosphere which is in abundant contact with the leaching solution, is oxidized to ferric sulphate, the regeneration of ferric sulphate taking place in situ in the heap of material being treated. Thus as the leaching solution percolates or trickles downward through the material undergoing treatment, fresh copper sulphide particles are being constantly exposed to the action of the ferric sulphate, and the ferrous sulphate formed by the reaction is constantly being oxidized into ferric sulphate which again attacks the copper sulphide.

As the above reactions take place within the heap, the free sulphur is largely deposited upon the ore or gangue particles in the heap and the copper-bearing solution, that is to say the solution containing copper sulphate and ferric sulphate and possibly some unconsumed sulphuric acid, drains from the heap at the lower end thereof and is collected in the launder 19. From the collecting launder, the copper-bearing solution may be passed through a reducing filter, such as a filter of chalcocite and oxidized ore, or through a comparatively small heap of fresh ore containing these substances, preferably concentrated, with the solution supplied in such profusion thereto as to substantially prevent air-oxidizing action; or the solution may be flowed through a tank containing chalcocite, the ore or the concentrate, so as to substantially immerse the solid contents of the tank, in order to reduce the ferric sulphate to ferrous sulphate, and to consume any sulphuric acid that may be present and by both of these reactions to usefully charge the solution with copper.

The copper-bearing solution is now ready for precipitating the copper therefrom and this may be accomplished by suitable treatment, such as by electrolysis, if the copper content is sufficiently high or for other reasons such process is economically available. On the other hand precipitation may be effected by cementation or contact of the solution with metallic iron, the latter method being usually economically available where the copper content is relatively low.

The spent solution from the precipitation process, carrying ferrous sulphate and preferably some unprecipitated copper in the form of sulphate, may then be transferred to a suitable oxidizing plant to oxidize the ferrous sulphate to ferric sulphate and to replenish the sulphuric acid content. This oxidizing step may be carried out according to any one of several known methods, such as agitating manganese dioxide with the solution, or by use of the process described in Patent No. 1,477,965 dated December 18, 1923, to Edmund S. Leaver. In carrying out the process of the latter patent, bubbles of sulphur dioxide gas and air are blown through the solution, thereby oxidizing the ferrous sulphate to ferric sulphate and forming substantial amounts of sulphuric acid.

By subjecting the solution to the above mentioned or other oxidizing process, such solution is regenerated and with such addition of water as may be required for proper dilution, is ready for use as a leaching solution, as above described, and the process is thus rendered cyclic.

My invention is to be understood as not limited in scope by any examples given by way of illustration of a preferable mode of operation but is to be considered as limited solely by the claims attached hereto as a part of this specification and in which I intend to claim all novelty inherent in my invention as is permissible in view of the prior art.

What I claim is:

1. A leaching process for the treatment of copper ores which consists in passing a leaching solution containing ferric sulphate through a heap of the ore under such conditions that atmospheric air is in contact with the solution as the solution moves in open drainage in contact with the ore, whereby a metal of the ore is leached and a constituent of the leaching solution is oxidized and thereby ferric sulphate regenerated in situ, and separating metal from the charged solution.

2. A leaching process for the treatment of copper ores which consists in passing a leaching solution containing ferric sulphate through a heap of the ore which has been crushed to a size to permit ready access of the leaching solution to the values in the ore under such conditions that atmospheric air is in contact with the solution as the solution moves in contact with the ore, whereby a metal of the ore is leached and a constituent of the leaching solution is oxidized and thereby ferric sulphate is regenerated in situ, and separating metal from the charged solution.

3. A leaching process for the treatment of copper ores which consists in effecting chemical reactions between the ore and a leaching solution containing ferric sulphate and an acid in the presence of uncombined oxygen whereby a metal of the ore is leached and ferric sulphate is reduced to ferrous sulphate and ferrous sulphate is oxidized to ferric sulphate and thereby ferric sulphate is regenerated in situ, subjecting the charged leaching solution to a reducing treatment, and separating metal from the reduced and charged solution.

4. A leaching process for the treatment of copper ores which consists in effecting chemical reactions between the ore and a leaching solution containing ferric sulphate and sulphuric acid in the presence of uncombined oxygen whereby a metal of the ore is leached and ferric sulphate is reduced to ferrous sulphate and ferrous sulphate is oxidized to ferric sulphate and thereby ferric sulphate is regenerated in situ, subjecting the charged leaching solution to a combined reducing and acid-diminishing treatment whereby ferric sulphate is reduced and sulphuric acid consumed, and separating metal from the reduced and charged solution.

5. A leaching process for the treatment of copper ores which consists in effecting chemical reactions between the ore and a leaching solution containing ferric sulphate and an acid in the presence of uncombined oxygen whereby a metal of the ore is leached and ferric sulphate is reduced to ferrous sulphate and ferrous sulphate is oxidized to ferric sulphate and thereby ferric sulphate is regenerated in situ, subjecting the charged leaching solution to a reducing treatment, separating metal from the reduced and charged solution, and subjecting the solution from which metal has been separated to an oxidizing and acid-forming treatment whereby the leaching solution is regenerated.

6. A leaching process for the treatment of copper ores which consists in effecting chemical reactions between the ore and a leaching solution containing ferric sulphate and sulphuric acid in the presence of uncombined oxygen whereby a metal of the ore is leached and ferric sulphate is reduced to ferrous sulphate and ferrous sulphate is oxidized to ferric sulphate and thereby ferric sulphate is regenerated in situ, subjecting the charged leaching solution to a combined reducing and acid-diminishing treatment whereby ferric sulphate is reduced and sulphuric acid consumed, separating metal from the reduced and charged solution, and subjecting the solution from which metal has been separated to an oxidizing and acid-forming treatment whereby the leaching solution is regenerated.

7. A leaching process for the treatment of copper ores which consists in passing a leaching solution through a heap of ore under such conditions that atmospheric air is in contact with the solution as the solution moves in open drainage in contact with the ore, whereby a metal of the ore is leached and a constituent of the leaching solution is regenerated in situ by oxidation, maintaining the heap enclosed and simultaneously subjecting it to solar heat rays while passing the leaching solution through the enclosed heap, whereby the heat of such solar rays is confined within the heap-enclosure and is there utilized by absorption to impart heat to the enclosed heap, and separating metal from the charged solution.

8. A leaching process for the treatment of copper ores which consists in passing a leaching solution through a heap of the ore which has been crushed to a size to permit ready access of the leaching solution to the values in the ore under such conditions that atmospheric air is in contact with the solution as the solution moves in open drainage in contact with the ore, whereby a metal of the ore is leached and a constituent of the leaching solution is regenerated in situ by oxidation, maintaining the heap enclosed and simultaneously subjecting it to solar heat rays while passing the leaching solution through the enclosed heap, whereby the heat of such solar rays is confined within the heap-enclosure and is there utilized by absorption to impart heat to the enclosed heap, and separating metal from the charged solution.

9. A leaching process for the treatment of copper ores which consists in passing a leaching solution in open drainage through a heap of the ore under such conditions that atmospheric air is in contact with the solution as the solution moves in contact with the ore, maintaining the heap enclosed and simultaneously subjecting it to solar heat rays while passing the leaching solution through the enclosed heap, whereby the heat of such solar rays is confined within the heap-enclosure and is there utilized by absorption to impart heat to the enclosed heap, and separating metal from the charged solution.

10. A leaching process for the treatment of copper ores which consists in passing a heated leaching solution through a heap of the ore with open drainage through the heap, maintaining the heap enclosed while passing the leaching solution through the same, whereby the leaching solution and the heap of ore are shielded against loss of heat and separating metal from the charged solution.

11. A leaching process for the treatment of copper ores which consists in passing a leaching solution through a heap of the ore which has been crushed to a size to permit ready access of the leaching solution to the values in the ore, maintaining the heap enclosed and simultaneously subjecting it to solar heat rays while passing the leaching solution through the enclosed heap, whereby the heat of such solar rays is confined within the heap-enclosure and is there utilized by absorption to impart heat to the enclosed heap, and separating metal from the charged solution.

In testimony whereof, I have affixed my signature to this specification.

GARRET MOTT.